March 31, 1964

D. R. HERRIOTT 3,127,604

AIRCRAFT RADAR SYSTEM WITH FEEDBACK OF RANGE SIGNAL
TO ANTENNA ELEVATION CONTROL AND DISPLAY
OF EQUIRANGE CONTOURS

Filed Oct. 11, 1960

INVENTOR
D. R. HERRIOTT
BY
Harry C. Hart
ATTORNEY

March 31, 1964

D. R. HERRIOTT 3,127,604

AIRCRAFT RADAR SYSTEM WITH FEEDBACK OF RANGE SIGNAL
TO ANTENNA ELEVATION CONTROL AND DISPLAY
OF EQUIRANGE CONTOURS

Filed Oct. 11, 1960

INVENTOR
D. R. HERRIOTT
BY
Harry C. Hart
ATTORNEY

INVENTOR
D. R. HERRIOTT
BY
Harry C. Hart
ATTORNEY

United States Patent Office 3,127,604
Patented Mar. 31, 1964

3,127,604
AIRCRAFT RADAR SYSTEM WITH FEEDBACK OF RANGE SIGNAL TO ANTENNA ELEVATION CONTROL AND DISPLAY OF EQUIRANGE CONTOURS
Donald R. Herriott, Morris Township, Morris County, N.J., assignor to Bell Telephone Laboratories, Incorporated, New York, N.Y., a corporation of New York
Filed Oct. 11, 1960, Ser. No. 61,914
11 Claims. (Cl. 343—7.4)

This invention deals with three dimensional displays, and particularly with the presentation, on a two-dimensional surface, of three-dimensional radar data.

In the interests of safety of air travel, it is important to provide the pilot of an aircraft with a realistic and readily interpretable image of the terrain toward and over which his aircraft is flying: an image that is as clear at night and in fog as it is in sunlight, and one that contains all the information as to azimuth, elevation and range, which he may require in order to avoid disastrous collisions. A radar beam has proved to be a reliable means for obtaining the required data, but the presentation of such data leaves much to be desired. The data for the three space coordinates have in the past been paired, permitting the presentation in various ways, requiring two or more viewing screens. The coordination of the information presented on two such screens requires of the pilot a mental effort, and this effort may be required of him at a critical time. Accordingly, it is an object of the invention to display the required information on a single screen.

It is elementary that a display screen, having only two dimensions, e.g., horizontal and vertical, can bear only a two-dimensional image. The retina of the eye is likewise a two-dimensional screen, and receives an image of only two dimensions, azimuth and elevation. The brain, however, is able to derive much information as to the third dimension, range, from this image. This it does by virtue of certain features of this image which, in the light of the observers experience, constitute clues as to range. Among these are perspective and contours. According to the principles of perspective, the brain, given a retinal image of two objects, known from experience to be of like size, one appearing large and the other small, concludes that the one object is near, the other far. When the eye sees a sharp contour, below which an entire object of one kind is exposed, while only the upper portion of an object of another kind is exposed above it, the immediate interpretation of the brain is that the second object lies behind the first.

The invention combines received radar data as to azimuth, elevation and range, and presents it on a screen as an image in which two of the coordinates of the object space are coordinates of the image while the third is a parameter. In particular the image, displayed on a screen of which the horizontal and vertical dimensions correspond to the azimuth and elevation coordinates, respectively, is constituted of a set of contours, each for a single specified range that is invariant throughout the contour, successive contours corresponding to successively different ranges. Because the determination of range is more precisely made with radar apparatus than with the human eye, these contours convey to the pilot valuable information in greater amount than his eye could give him, even in clear weather.

Each of the contours is traced on the viewing screen by causing the radar beam itself to trace an equirange contour on the terrain and arranging that the indicator shall sweep over the screen in a fashion that is always spatially congruent with the sweep of the radar beam across the terrain. Each sweep of the radar beam is caused to follow an equirange path across the terrain by continually monitoring the radar range determination and supplying a derived control signal to elevate the radar beam when the determined range is less than a preset nominal value and to depress it when it is more. Successive contours are swept out by presetting successively different values of the nominal range.

In the resulting image, significant topographical features of the terrain are sharply outlined so that the pilot can recognize them without mental effort and with a minimum of attention. Moreover, of two like objects, one of which is at a greater distance from the aircraft than the other, the angle subtended at the radar antenna by the farther one is smaller than the angle subtended by the nearer one. Hence the contour described by the radar beam in outlining the more distant object is smaller than the contour described in outlining the nearer object. Because of the spatial congruence between the movements of the beam and those of the indicator, the outline, on the image screen, representing the further object is smaller than that representing the nearer object. Thus the image contains perspective, an additional clue for the pilot as to his distance from particular topographical features, and the perspective is given emphasis by the fact that the image is constituted entirely of contours.

The invention will be fully apprehended from the following detailed description of an illustrative embodiment thereof, taken in connection with the appended drawings in which:

FIG. 2 is a schematic circuit diagram showing the apparatus of the invention.

Figure 1:
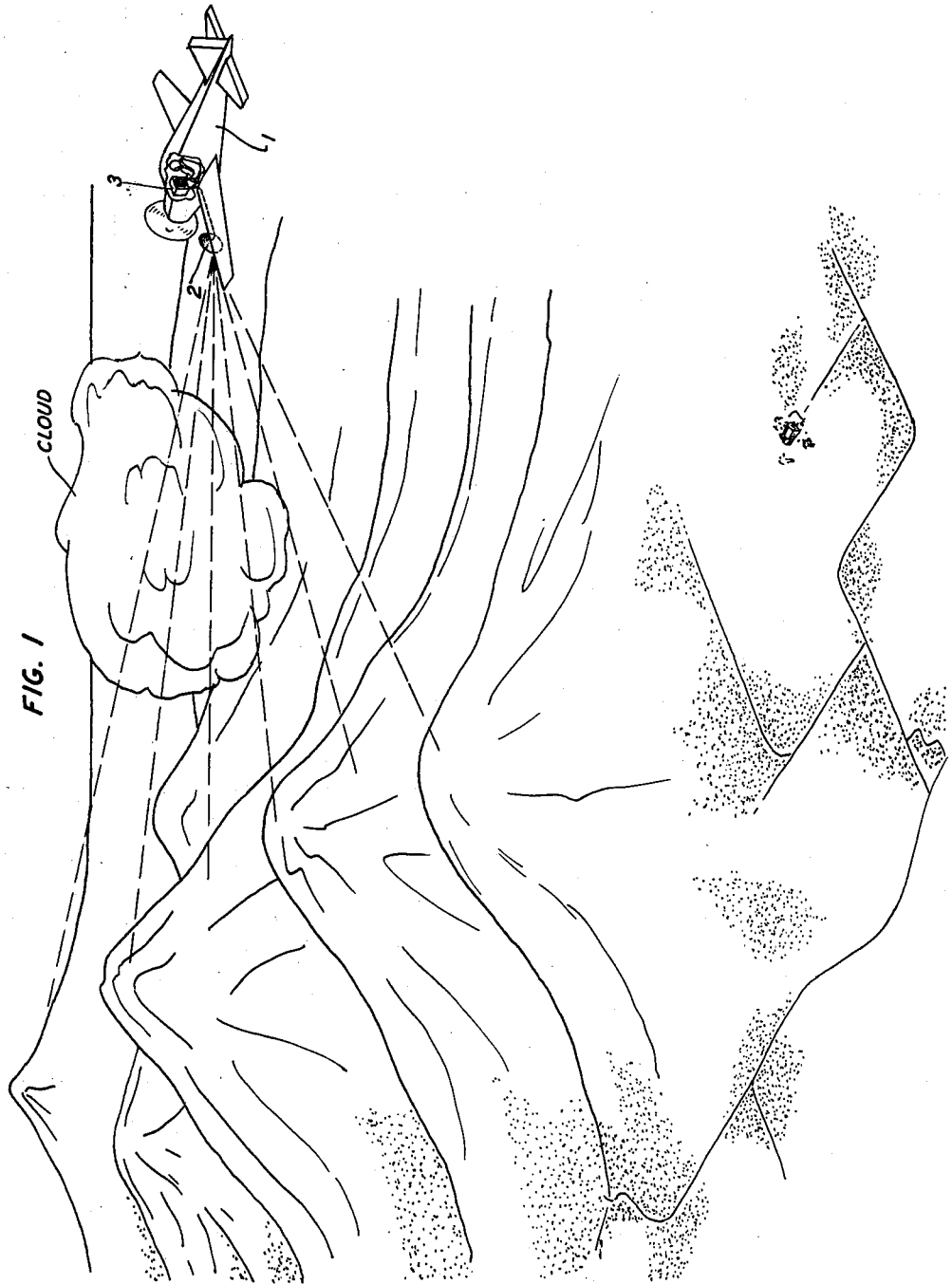
FIG. 1 is a pictorial representation of an aircraft, equipped with the apparatus of the invention, flying toward and over mountainous terrain.

Referring now to the drawings, FIG. 1 shows an aircraft 1 flying toward and over mountainous terrain that is concealed from the eyes of the pilot by a cloud. In the position shown, the aircraft is about to cross a range of foothills in safety. Some miles beyond these foothills is a range of mountains whose peaks are substantially higher than the present flight path of the aircraft 1. To avoid disaster, it is imperative that the pilot receive adequate warning of his approach toward this mountain range. To provide this warning the aircraft is equipped with the apparatus of the invention, including a radar antenna 2 that projects a beam of radar energy forward and below the flight path and receives it after reflection and return, a cathode ray oscilloscope on the screen 3 of which an image of the terrain is presented to the pilot, and control apparatus not shown in FIG. 1.

In accordance wth the invention, the radar beam is moved in a particular way. In practice it will generally be preferred to utilize wholly electrical means for causing the radar beam to execute its required movements. Electrical techniques and apparatus of the required sort are well known. For the sake of clarity and simplicity of illustration, however, the apparatus selected for effecting these movements is electromechanical, so that the radar antenna 2 itself is moved physically about one axis which is in turn rotated about another axis. This embodiment, together with the associated control apparatus, is shown in FIG. 2.

Referring to FIG. 2, a supporting bracket 5 is fixed to the forward part of the aircraft 1, and the radar antenna 2, which may comprise an open-ended waveguide 6 and a parabolic reflector 7, is mounted on this bracket in a fashion to permit rotational movement about two mutually perpendicular axes. The first axis is provided by a shaft 8, rotatably supported by the bracket 5 and parallel with the transverse axis of the aircraft 1. It is thus horizontal when the aircraft is in level flight. While it tilts when the aircraft is in the course of a banking turn, it will be termed a "horizontal" axis, for short. Mounted on the horizontal shaft 8 is a second shaft 9, perpendicular to the first and bearing the radar antenna 2. The shaft 9 thus defines a second axis. When the first axis is horizontal, the second axis therefore lies in a vertical plane and rotation of the antenna assembly about the first axis rotates the antenna in this vertical plane. The antenna itself, which rotates about the second axis, thus projects its radar beam in a slant plane which departs from the horizontal plane by the angle through which the assembly has been rotated about the first axis. With this understanding, the second axis will be termed, for short, a "vertical" axis and movements of the antenna about it will similarly be termed, for short, "horizontal movements."

The horizontal movements of the antenna 2 about the vertical axis, i.e., the shaft 9, are controlled by a horizontal scan motor 10 that is driven, through a speed control unit 11 to be described, by a power source 12. The vertical movements about the horizontal axis, i.e., the shaft 8, are controlled by a vertical servomotor 13 that is driven by a control signal as described below and drives a conventional worm and sector gear train. For the purposes of the invention, the horizontal movements may advantageously be of the simplest kind. That is to say, the antenna 2 may be caused to swing back and forth in azimuth, and in the slant plane, as by a link 15 that is mounted eccentrically on a disc 16 driven in rotation by the horizontal scan motor 10. Aside from variations introduced by the speed control unit 11 as described below, the frequency of the azimuthal swings may be of the order of 1 cycle per second, or 2 lateral sweeps per second. Vertical movements of the antenna 2, i.e., angular movements in elevation or depression, are more complicated and will be best understood after the description of the remainder of the apparatus has been completed.

A pulse generator 20 for example a multivibrator, delivers a train of like pulses at uniform intervals on the time scale and at a suitable repetition rate, for example 2,000 pulses per second. With 2 azimuthal sweeps per second, this pulse rate gives 1,000 pulses per sweep. Each such pulse is converted to a burst of high frequency oscillations by a modulator, driven by an oscillator 22. Each burst is passed by way of a waveguide 23 through a transmit-receive switch 24 of well known variety to the radar antenna which projects it as a beam toward a part of the terrain determined by the momentary orientation of the antenna. After reflection by this part of the terrain, energy of the beam returns to the aircraft 1 where it is picked up by the antenna 2, passed through the switch 24 to a rectifier 25 which removes the radio frequency oscillations, and the resulting pulse 26 is passed to one input point of a phase comparator 30. Because the propagation of a radio wave in an unlimited medium takes place at the speed of light, a constant of nature, the time at which the returned pulse reaches the phase comparator 30 is a measure of the slant range from the antenna to the particular area of the terrain at which reflection takes place.

Each pulse from the pulse generator 20 is also delivered to a time interval generator. This may conveniently take the form of a delay line 31 having a number of lateral taps, e.g., twenty taps. All of the first $n-1$ taps, in the present illustration all of the first nineteen, are equally spaced apart along the length of the delay line 31 and by distances that correspond, in the fashion to be described, to equal intervals of preset range, for example, one mile. The last tap, in this case the twentieth, is spaced from its predecessor several times as far; illustratively, by a distance that corresponds to a change in preset range of eighty miles. The reason for this single departure from regularity of tap spacing will appear below.

A wiper 32 makes contact with each of these lateral taps in turn, and after making contact with the last one makes contact again with the first and repeats the cycle. The wiper 32 is advanced from each tap to the next by a sequential stepping relay 33 that is energized by a battery 34 each time a limit switch 35 is closed. In accordance with the invention the advance of the wiper 32 from tap to tap is to be synchronized with the horizontal sweeps of the radar antenna, and this result is conveniently secured by arranging that the limit switch 35 be closed by a link 36 each time the radar antenna reaches either end of its horizontal swing.

The wiper 32 thus picks off the delay line 31 the pulse delivered by the pulse generator 20 after a time interval determined by the length of the delay line between its input point and the particular tap with which the wiper 32 is momentarily making contact. This delayed pulse is applied to a second input point of the phase comparator 30, advantageously after being inverted in polarity by an inverter 37.

The phase comparator 30, which may be of well known construction, thus delivers an output signal of one polarity if the reflected radar pulse reaches it before the locally delayed pulse and of the opposite polarity if the reflected radar pulse reaches it after the locally delayed pulse. Furthermore, the magnitude of this output is representative of the interval between the arrival time, at the phase comparator 30, of the reflected radar pulse and that of the locally delayed pulse.

This output signal is utilized to drive the vertical servomotor 13 and so to rotate the radar antenna 2 about its horizontal axis in one direction or the other, thus to elevate or depress the radar beam as called for by the polarity of the signal, and at a speed that depends, at least in part, on the magnitude of the signal. When the control signal is of a polarity representing an early return of the reflected pulse, the beam is elevated and thus projected toward a more distant part of the terrain, which makes for a later return of the reflected pulse. When the signal is of opposite polarity, representing a late return of the reflected pulse, the radar beam is depressed and thus projected toward a nearer part of the terrain, which makes for an earlier return of the reflected pulse. Thus, for each polarity of the signal delivered to the servomotor 13, the radar beam is elevated or depressed, as required, until the magnitude of this control signal becomes zero, and rotation of the motor 13 and movement of the antenna about its horizontal axis 8 cease; and this cessation of movement in the elevation coordinate takes place when the reflected radar pulse reaches the phase comparator 30 at the same instant as does the locally delayed pulse. In other words, it takes place when radar range, as determined by the propagation time of the reflected pulse, is equal to preset range, as determined by the length of the delay line 31 from its input point to the particular tap with which the wiper 32 is momentarily in contact.

The aircraft is provided with an oscilloscope 40 of which the screen 3 is mounted on the control panel at a point convenient to the pilot. The oscilloscope may be of conventional construction having an electron gun, a luminescent screen 3, horizontal deflection elements 41 and vertical deflection elements 42. In accordance with the invention, the luminous spot which results from impact of the electron beam on the screen 3 is caused to execute movements that are spatially congruent with the movements of the radar beam. Thus, its horizontal movements from side to side of the screen 3 are produced by a deflection signal that is coordinated with the horizontal scanning movements of the radar antenna. Such a signal is conveniently derived from a potentiometer 45 comprising a resistor 46 connected across the terminals of a battery 47 and having a wiper arm 48 that is mechanically coupled to the link 15 that controls the horizontal sweep movements of the radar antenna. The voltage appearing between the wiper arm 48 and the midpoint of the battery 47 is applied through a horizontal amplifier 49 to the horizontal deflection plates 41 of the oscilloscope 40. Thus the luminous point sweeps from side to side of the oscilloscope screen 3, once for each lateral sweep of the radar beam.

Similarly, vertical movements of the luminescent spot on the oscilloscope screen 3 are controlled by application to the vertical deflection elements 42, through a vertical amplifier 50 of a signal that is proportional to the momentary elevation of the radar beam. This result may readily be secured through a potentiometer 53 comprising a resistor 54 connected across a battery 55 and having a wiper arm 56 that is mechanically driven by the vertical servomotor 13 so that the movements of the wiper arm 56, and therefore the movements of the luminescent spot in the vertical dimension, conform to the angular movements of the radar beam in the elevation coordinate.

When the apparatus is placed in operation, the initial magnitude of preset range is short, as determined by the length of the delay line 31 from its input point to the first tap with which the wiper 32 is now in contact. Assuming that, initially, the angle of depression of the radar beam is zero, the radar beam is projected to a great distance and energy reflected from a distant part of the terrain is returned after an interval substantially longer than the preset interval. The phase comparator 30 and the vertical servomotor 13 together operate to depress the radar beam until radar range is equal to preset range, and this readjustment takes place in a small fraction of the time occupied by a single horizontal sweep of the beam.

The horizontal swinging movements of the antenna cause the radar beam to sweep from one side of the flight path of the aircraft 1 to the other in a plane determined by its angle of depression. As long as the terrain above which the aircraft is flying is devoid of significant contours or obstacles, the depression angle remains unaltered and the luminescent spot traces a straight horizontal line across the face of the oscilloscope screen 3. When, however, the radar beam encounters an obstacle such as the shoulder of a mountain, the reflected pulse returns earlier than theretofore. As explained above, this causes the vertical servomotor 13 to be energized and the depression angle of the radar beam is reduced until the pulse propagation time is again equalized with the locally preset delay time. Similarly, after the beam has passed the crest of the mountain, propagation time increases and the beam is depressed until propagation time is again equalized with locally preset delay time.

Thus, the radar beam sweeps through a contour of equal range from the aircraft to the terrain and the ranges for all points of this contour have the same fixed value determined by the locally preset delay time.

When the lateral sweep of the antenna in one direction along one contour has been completed, the limit switch 35 is momentarily closed to apply voltage of the battery 34 to the sequential stepping relay 33. This abruptly advances the wiper arm 32 from the first tap of the delay line 31 to the second tap, thus to provide a new value of local delay time and thus of preset range; e.g., a range that is one mile greater than the preceding preset range. The antenna then executes the next horizontal sweep, tracing out a new contour on the terrain for all points of which radar range is equated with the new value of preset range.

Figure 3:
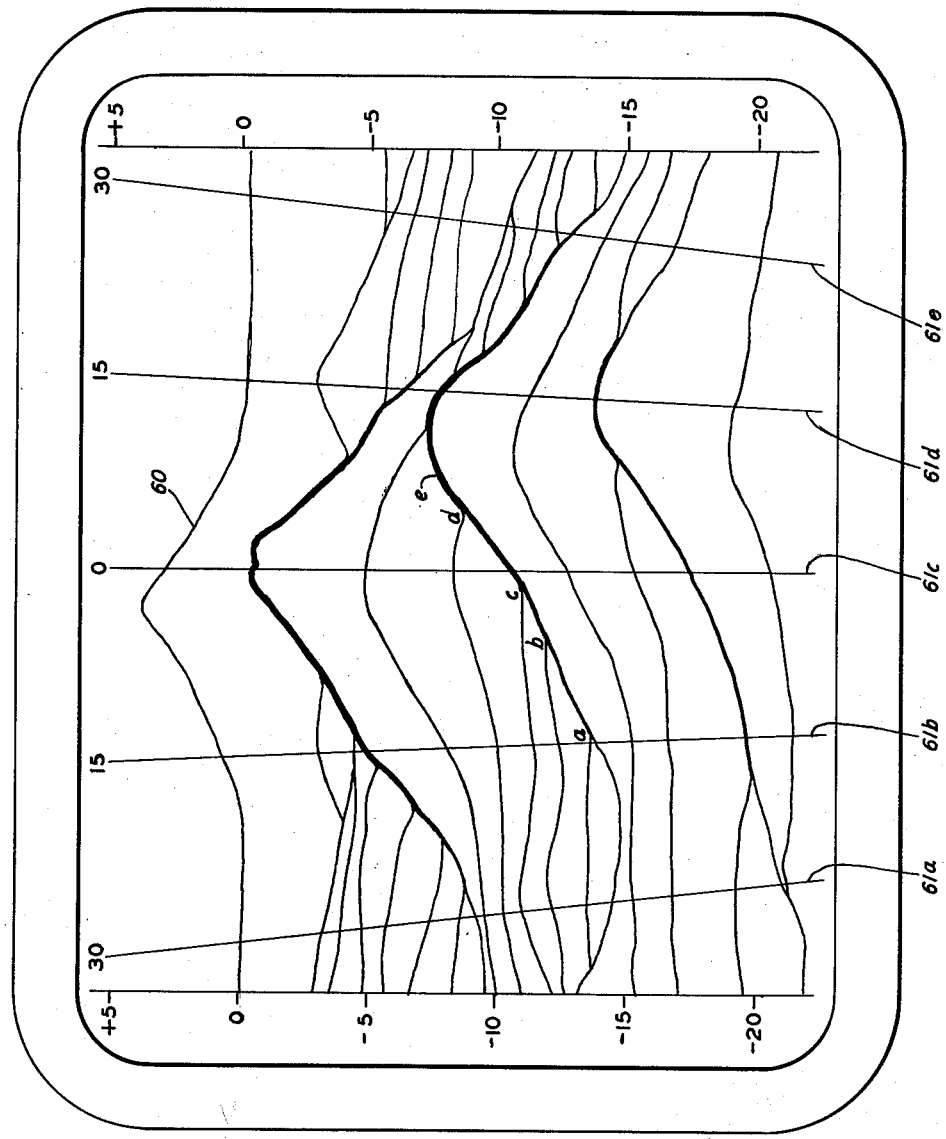
FIG. 3 is a diagrammatic representation of an image of the terrain of FIG. 1 as presented to the aircraft pilot through the agency of the invention.

FIG. 3 is a diagram depicting the appearance, on the oscilloscope screen 3, of a realistic image of the terrain toward and over which the aircraft 1 is flying, as derived by the apparatus of the invention. It comprises a plurality of individual traces, each representing a single fixed range contour. It will be observed that contours for several different ranges intersect a single mountain at various heights along its shoulder, e.g., at a, b, c, d and coincide at its crest. This feature brings the contours of the terrain strongly into prominence, and the larger the mountain or other object, the greater is the emphasis provided by coincidence of contours. Each individual trace corresponds to a single invariant radar range. Provided only that all but the last of the taps of the delay line 31 are equally spaced apart, all the individual traces but the last represent contours that are spaced apart by equal amounts in the range coordinate. Hence the image as a whole embodies perspective, and the viewing of several traces together immediately generates in the mind of the viewer a correct impression of the distances that separate him from the various topographical features of the terrain.

In contrast, the last sweep of the radar beam traces out a contour on the terrain of which all points are at a much greater distance from the aircraft, e.g., 99 miles away. This distance being at approximately the limit of visibility for an aircraft pilot in clear weather, it lies at or close to the horizon. Inasmuch as each trace of the luminous spot on the viewing screen 3 is congruent with the corresponding contour traced by the radar beam on the terrain, this last and uppermost trace 60 conveniently represents the contour of the horizon. The apparatus components are therefore advantageously coordinated in such a fashion that when this last trace 60 is executed, the radar beam is projected directly ahead of the aircraft 1.

With this coordination, when the trace representing the outline of any mountain peak or other obstacle, near or far, extends above the straight portions of the horizon trace 60, the pilot is thereby warned that the obstacle represented by the excursion of the trace constitutes a hazard.

Whatever may be the position of the oscilloscope screen 3 within the aircraft 1, the traces produced on it constitute an image, in perspective, of the terrain that lies below and forward of the momentary position of his aircraft. To emphasize this in the mind of the pilot, the face of the screen may advantageously be provided with a pattern of lines 61a–61e, opposite in shade to the shade of the traces, that appear to radiate from a point of the terrain immediately below the aircraft. These lines, shown in FIG. 3, may be numbered to match the azimuth angles that they represent. The side margins of the screen may advantageously be graduated in degrees of elevation.

In the case of exceptionally rugged terrain, the apparatus as thus far described may require the radar beam to make a large and rapid change in elevation without slowing down its movement in azimuth. This results in a substantial sudden increase in the vector velocity of the radar beam and hence in a loss of resolution. Inasmuch as the luminous spot moves across the oscilloscope screen 3 in conformity with the movements of the radar beam across the terrain, an abrupt increase in the velocity of the spot also takes place, and this results in a reduction in the brightness of the spot.

In accordance with a further feature of the invention, these disadvantageous results are prevented by holding the vector velocity of the radar antenna approximately constant throughout the tracing of each single contour. To this end the control signal that is derived by the comparator 30 and actuates the vertical servomotor 13 is utilized, as well, to modify the speed of the horizontal scan motor 10. Thus, after rectification by a unit 59, the signal is applied to the input point of the auxiliary motor speed control unit 11 through which the power supply source 12 is connected to the horizontal scan motor 10. This unit 11, which may be of well known construction, acts to reduce the speed of the horizontal scan motor 10 when the signal applied to the vertical servomotor 13 is of large magnitude, positive or negative, and to increase the speed of the horizontal scan motor 10 when the vertical motor control signal is small.

Each of the equal range contours swept out by the radar beam is, in principle, the intersection with the terrain of a spherical surface having its center at the radar antenna. For small or moderate angular movements of the antenna, each of these spherical surfaces differs but little from a plane surface normal to the radar beam. With the addition of trigonometrical computer devices of known character, the contours may be modified to be intersections with the terrain of true planes in contrast to approximate planes. With the introduction of further refinements of the same sort, these planes become vertical planes in contrast to planes that are normal to the radar beam. Still other refinements will suggest themselves to those skilled in the art.

What is claimed is:

1. In an aircraft, apparatus for displaying to a pilot of said aircraft a realistic and readily interpretable image of the topographical features of the terrain toward which said aircraft is flying, which comprises radar means mounted in said aircraft for projecting a beam of pulsed energy forwardly of said aircraft, elevation control means for depressing said beam through a continuously variable angle below the flight path of said aircraft, whereby said beam is reflected by said terrain, azimuth scan means for repeatedly sweeping said beam laterally across said terrain, means for developing a first signal upon return to said aircraft of pulses of said beam, time delay means for generating a second signal after the passage of a preassigned time following the projection of each of said pulses, means for comparing said second signal with said first signal to derive a third signal indicative of the temporal order of said first and second signals and of the interval between them, a connection extending from said comparing means to said elevation control means for applying said third signal to said elevation control means in a sense to reduce said last-named interval, whereby said projected energy beam sweeps a path over the terrain that is of constant slant range when the beam is unobstructed and traces the outline of an intervening obstruction, means for altering said preassigned time interval by a preassigned amount between each lateral sweep of said beam and the next, a display device having a screen and horizontally and vertically deflectable indicating means, means for deflecting said indicating means horizontally in conformance with the lateral sweeps of said energy beam, and means for deflecting said indicating means vertically in conformance with the elevation angle of said energy beam, whereby the successive traces of said indicating means on said screen are representative of successive sweeps of said energy beam at successively different slant ranges.

2. Apparatus as defined in claim 1 wherein said elevation control means comprises a first shaft, mounted for rotation about a first axis fixed to the transverse axis of said aircraft, wherein said azimuth scan means comprises a second shaft rotatably supported by and extending perpendicular to said first shaft, and wherein said beam projecting means is fixed to said second shaft, whereby, when said aircraft is in level flight, each azimuthal scan of said beam sweeps out an area that lies in the slant range plane that is perpendicular to a vertical plane.

3. Apparatus as defined in claim 1 wherein the vertical deflecting means is so coordinated with the energy beam elevation control means that a trace of said indicating means along the lower margin of said screen is congruent with a sweep of said energy beam at the maximum depression angle of said elevation control means.

4. Apparatus as defined in claim 1 wherein the vertical deflecting means is so coordinated with the energy beam elevation control means that the uppermost one of the traces on said screen, when it is a substantially straight line, is congruent with a sweep of said energy beam along an unobstructed contour of maximum range, and hence is representative of the horizon, as viewed from said aircraft in clear weather.

5. Apparatus as defined in claim 1 wherein said screen is provided with a plurality of visible straight lines that diverge from a point, below the lower margin of said screen, that is representative of a point on the terrain lying vertically below said aircraft.

6. In combination with apparatus as defined in claim 1, means for deriving an auxiliary signal that is representative of the rate of movement of said elevation control means, and means under control of said auxiliary signal for reducing the speed of said azimuth scan means.

7. In combination with apparatus as defined in claim 1, means for rectifying said third signal to derive a fourth signal that is representative of the absolute magnitude of the time interval between said first and second signals, and means under control of said fourth signal for reducing the speed of said lateral beam sweeping means.

8. Apparatus for displaying to the pilot of an aircraft a two-dimensional representation of the terrain toward and over which said aircraft is flying which comprises means for projecting an energy beam toward a point of said terrain, means for recovering reflected energy returned from said point, means for deriving from said reflected energy a control signal representative of the propagation time of said energy over its projected and reflected paths, means for angularly sweeping said beam across said terrain in an azimuth coordinate, means responsive to said control signal for angularly deflecting said beam in an elevation coordinate to hold constant said propagation time at each of a set of discretely different values, one for each of said azimuthal sweeps, a display screen, an indicator, and means causing said indicator to move on said screen in horizontal and vertical directions in related conformance with the movements of said beam in said azimuth and elevation coordinates, respectively.

9. Apparatus for displaying, on a two-dimensional screen, a representation of the topographical features of terrain above which said apparatus is located which comprises means for projecting an energy beam toward a point of said field, means for deriving from energy of said beam a control signal representative of the propagation time of said projected energy, means for sweeping said beam across said field in a first angular coordinate, means responsive to said control signal for deflecting said beam in a second angular coordinate to hold constant said propagation time at each of a set of discretely different values, one for each of said first coordinate sweeps, an indicator, and means causing said indicator to move on said screen in two planar coordinates in related conformance with the movements of said beam in said angular coordinates, respectively.

10. Apparatus for displaying, on a two-dimensional screen, a representation of the topographical features of terrain above which said apparatus is located, which comprises means for projecting an energy beam toward a point of said field, means for deriving from energy of said beam a marker signal representative of the length of said beam, means for sweeping said beam across said field in a first coordinate, means responsive to said marker signal for deflecting said beam in a second coordinate to hold constant said beam length at each of a set of discretely different values, one for each of said first coordinate sweeps, an indicator, and means causing said indicator to move on said screen in two dimensions in related conformance with the movements of said beam in said angular coordinates, respectively.

11. In an aircraft, apparatus for displaying to a pilot of said aircraft a realistic and readily interpretable image of the topographical features of the terrain toward and over which said aircraft is flying which comprises radar means mounted in said aircraft for projecting a beam of energy pulses forwardly of said aircraft and at a depression angle below the line of flight of said aircraft, means in said aircraft for recovering echoes of the pulses of said beam that are reflected by said terrain, elevation control means coupled to said radar means for variably altering said depression angle through a continuous range, azimuth scan means coupled to said radar means for repeatedly sweeping said beam laterally across said terrain, means connected to said echo recovering means for developing from said returned pulse echoes a first signal representative of radar range from said aircraft to the point of said terrain from which said pulse echoes are returned, means for generating a second signal, representative of preset range, after the passage of a preassigned time interval following the projection of each of said pulses, means connected to the developing means and to the generating means for comparing said second signal with said first signal to derive a third signal indicative of the temporal order of said first and second signals and of the interval between them and hence representative of a discrepancy between preset range and radar range, means coupling said comparing means with said elevation control means for applying said third signal as a control signal to said elevation control means to alter said beam depression angle in the course of a single azimuth sweep in a sense to continuously redirect said beam toward a part of said terrain for which said range discrepancy-representing signal is reduced, said alterations in beam depression angle thus combining with the azimuth sweep in the course of which they take place to produce a resultant movement of the beam that traces a path over the terrain which is of constant slant range when the beam is unobstructed and follows the outline of an intervening obstruction, means coupled to said second signal generating means for altering said preassigned time interval by a preassigned amount between each lateral sweep of said beam and the next, a display device having a screen, an indicator and means for deflecting said indicator horizontally and vertically over said screen, a control path coupling said azimuth scan means to said horizontal deflecting means to cause horizontal movements of said indicator in synchronism with lateral sweeps of said beam, and a control path extending from said elevation control means to said vertical deflecting means to cause vertical movements of said indicator over said screen in synchronism with alterations of said beam depression angle, whereby the successive traces of said indicator on said screen are similar in shape to the terrain contours followed by said beam at successively different slant ranges.

References Cited in the file of this patent
UNITED STATES PATENTS

| | | |
|---|---|---|
| 2,426,189 | Espenchied | Aug. 26, 1947 |
| 2,539,905 | Herbst | Jan. 30, 1951 |
| 2,929,058 | Blasberg et al. | Mar. 15, 1960 |
| 2,942,258 | Priest | June 21, 1960 |
| 2,999,235 | Von Segebaden | Sept. 5, 1961 |
| 3,085,243 | Bond | Apr. 9, 1963 |